United States Patent [19]

Wang

[11] Patent Number: 5,632,318
[45] Date of Patent: May 27, 1997

[54] MULTI-WINDOW SUN SHIELD

[75] Inventor: John Wang, Sylmar, Calif.

[73] Assignee: Auto-Shade, Inc., Moorpark, Calif.

[21] Appl. No.: 511,461

[22] Filed: Aug. 4, 1995

[51] Int. Cl.$^6$ ................................................. B60J 1/20
[52] U.S. Cl. ........................ 160/370.21; 160/368.1; 160/390; 296/97.7; 296/97.8
[58] Field of Search ............... 160/370.21, 370.23, 160/368.1, 370.2 R, 390; 296/97.7, 97.8

[56] References Cited

U.S. PATENT DOCUMENTS

| | | |
|---|---|---|
| 4,815,784 | 3/1989 | Zheng . |
| 4,862,943 | 9/1989 | Shafia ................................ 160/370.21 |
| 4,923,239 | 5/1990 | Wischusen, III et al. ............ 296/97.7 |
| 5,024,262 | 6/1991 | Huang ........................... 160/370.21 X |
| 5,035,460 | 7/1991 | Huang ........................... 160/370.21 X |
| 5,314,226 | 5/1994 | Tovar ............................. 160/370.21 X |
| 5,356,191 | 10/1994 | Sheehan ....................... 160/370.21 X |

*Primary Examiner*—Blair Johnson
*Assistant Examiner*—Bruce A. Lev
*Attorney, Agent, or Firm*—Blakely Sokoloff Taylor & Zafman

[57] ABSTRACT

A sun shield for covering a plurality of windows defining at least one substantial angle. The sun shield has a flexible frame which is easily collapsible for storage. Encompassing upon the frame is an opaque flexible material which blocks sunlight. Coupled to the flexible material encompassing the frame is a flexible flap which can shield windows defining a substantial angle with a window shield by the defined frame and encompassing material.

14 Claims, 4 Drawing Sheets

MULTI-WINDOW SUN SHIELD

BACKGROUND OF THE INVENTION

1. Field of the Invention

The present invention relates to sunshields, and particularly to a collapsible window shade apparatus capable of covering a plurality of windows.

2. Art Background

In the past, sunshields have been used to shield the interior of a car from sunlight and heat. Sunshields have also been used to provide a cover for visually concealing the contents of the passenger compartment. One example of a prior art sunshield is a simple cardboard sheet that is folded in an accordion-like fashion. These folding cardboard shades are typically unfolded and placed across the front windshield of a car. Unfortunately, these prior art windshield shades have a tendency to contract toward the initial folded position because of the creases in the cardboard. Additionally, even when fully folded, the accordion shades are somewhat bulky to pack and store.

Another type of sunshields are the shields that are collapsible for compact storage. Typically, the sunshields have a pair of closed loop flexible frames that are covered and coupled by two opaque sheets of fabric material. These types of sunshields also have a hinge area that separates the frames, and thereby allows the frames to be placed on top of each other in order to twist and fold them into a plurality of smaller concentric loops which can be stored. Unfortunately, these prior art collapsible sunshields can not cover a plurality of windows. More specifically, a prior art collapsible sunshield can not cover the windshield and the side windows of a car simultaneously. Consequently, it is desirable to have a cost efficient sunshield that is collapsible for compact storage and that could be used to cover multiple windows defining one or more substantial angles.

BRIEF SUMMARY OF THE INVENTION

The invention comprises a flexible frame covered with an opaque flexible material and at least one flap disposed adjacent to the covered frame and coupled thereto. The coupling can be performed by a snap or any conventional fastening device or the flap can even be physically sewn to or integrally formed from the flexible material which covers the frame.

The instant invention provides a sun shield which is collapsible for easy storage and is also capable of covering multiple windows simultaneously. Further, the windows to be covered can define substantial angles or even lie in planes which are not perpendicular to one another. The instant invention thereby allows maximum shading while reducing required storage area and a reduced number of units required to achieve the desired level of sun shielding.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 4:
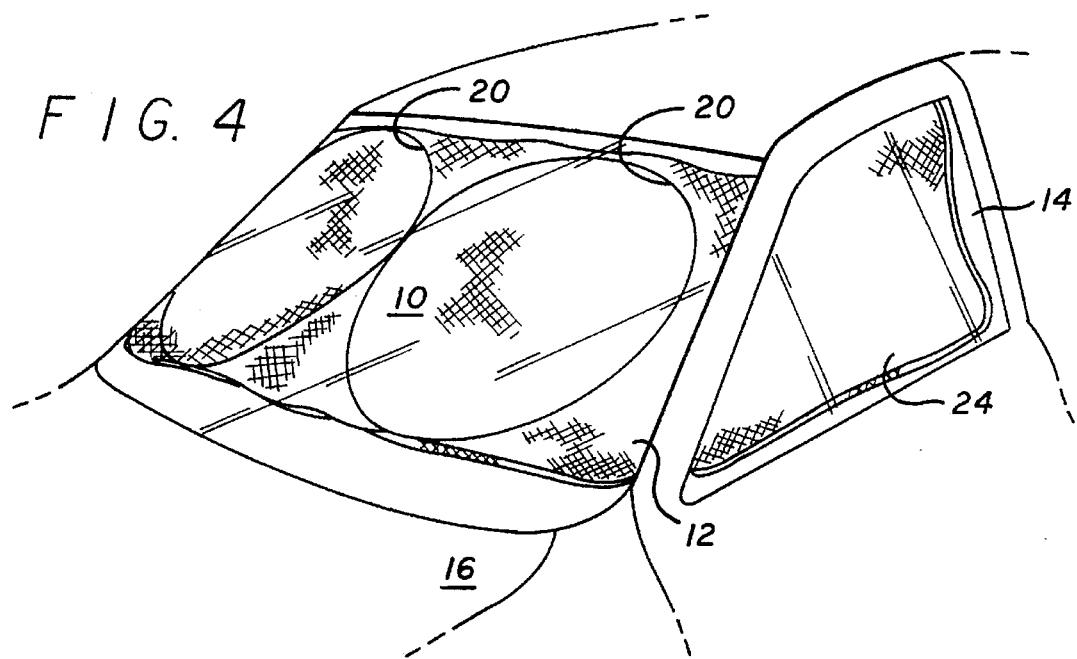
FIG. 4 is an external installed view of a collapsible sunshield assembly of FIG. 1 covering the windshield and the side windows of an automobile.

Referring to the drawings more particularly by reference numbers, FIG. 4 shows a collapsible sunshield assembly 10 of the present invention installed covering the windshield 12 and side windows 14 of an automobile 16. Sunshield 10 provides maximum protection against the transmission of sunlight and heat into the interior of the car, because sunshield 10 not only covers the windshield but also covers the side windows. In addition, the ability of sunshield 10 to cover the windshield and side windows provides a complete cover for visually concealing the contents of the passenger compartment. It should be noted, that although use of the sunshield assembly 10 in an automobile is shown and described, the present invention may be used to cover other windows. For example, assembly 10 may cover the window(s) of a commercial/residential building to shield the interior of the structure from sun and heat.

Figure 1:
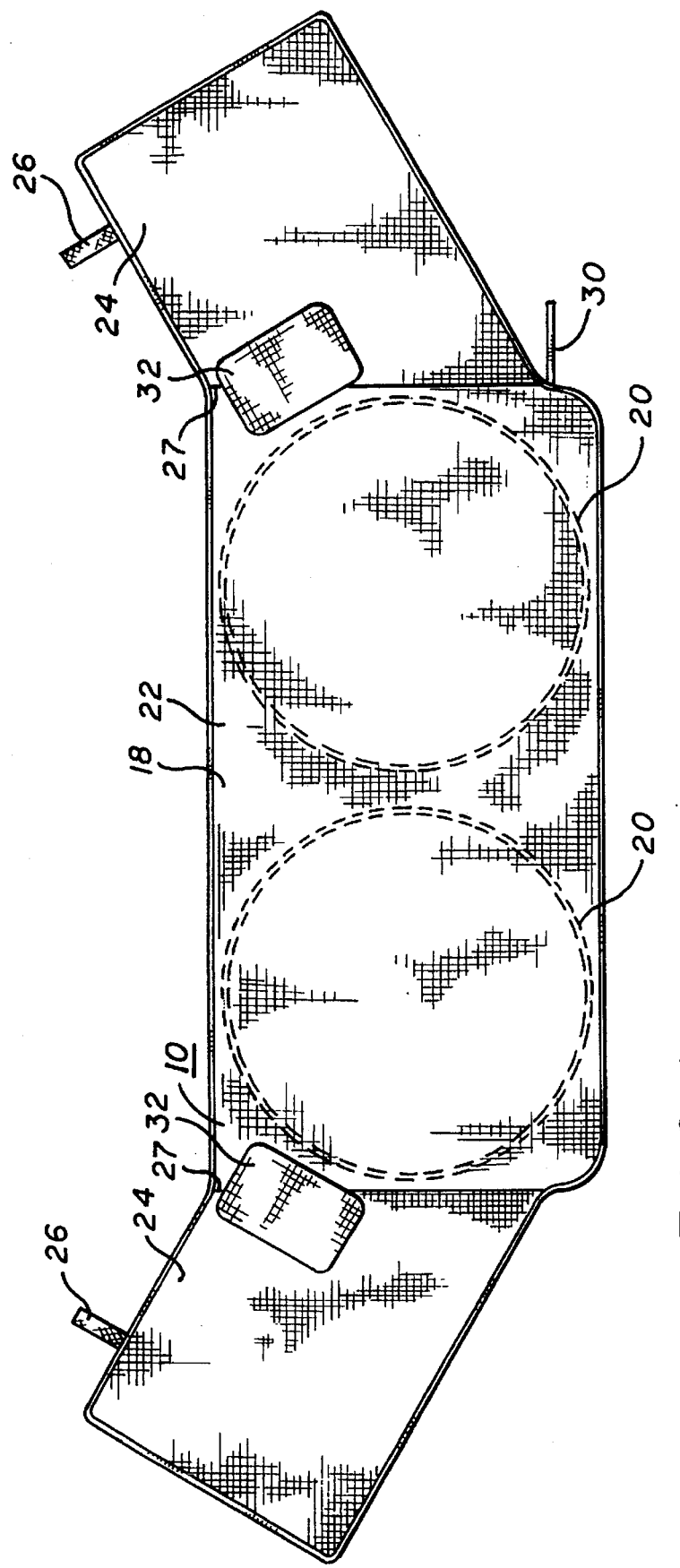
FIG. 1 is a perspective top view of an exemplary embodiment of a collapsible sunshield assembly of the invention.

As shown in FIG. 1, window shade apparatus 10 has a flexible fabric sheet 18, attached to a flexible frame 20. Flexible frame 20 is formed by two independent strips that are bent into a close loop and joined together by a clip or other fastening means. In addition, the strip is composed of a spring-like metal or plastic that can be readily twisted and folded without yielding material. In one embodiment of the present invention, flexible fabric frame 20 is constructed from steel wire, which is both flexible and strong.

As mentioned before, flexible fabric sheet 18 covers flexible frame 20. Flexible fabric 18 includes center section 22 and flaps 24. The flaps 24 attach to the center section 22 along lines 27. Center section 22 has two layers in between which flexible frames 20 are positioned. More specifically, flexible frames 20 are placed adjacent to each other between the two layers of flexible fabric's center section 22 and are then affixed to center section 22 by sewing the two layers of center section 22 along the boundaries of flexible frames 20. It should be noted that in alternative embodiments of the present invention, flexible frames 20 could be attached to a one layer center section 22 by a hem strip that extends around the entire length of the frame. As mentioned before, flexible fabric sheet 18 also includes flaps 24 which extend at an angle from the center section 22. As shown in FIG. 4, these flaps are designed to cover the front side windows of the automobile. In addition, flaps 24 have tab 26 that can be used to affix the flap 24 such that a side window is shaded. More specifically, tab 26 can be placed on top of the glass as the window is rolled up until the tab is pinched between the window and the window well of a car or attached to the side window by suction cup attached to the tab. A suction cup may also be coupled directly to the flap 24 for attachment to the side window. Alternatively, the side flaps 24 may also be secured to the side windows by providing tabs 26 that are constructed of Velcro material, which allows the tabs 26 to be coupled to the front shoulder belts or any alternative attachment location above the side windows. The bottom of the shade is then supported by the door frame. The tabs 26 could also be elastic or a fabric webbing, possibly coupled to suction cups or any other conventional attachment device such as snaps and buckles.

In one embodiment, pockets 32 are disposed partially on the center section and partially on the flap 24. The pocket has a zipper (not shown) which traverses at least a portion of the perimeter of the pocket 32. In preparation for storing, the flap 24 can be folded or stuffed into the pocket 32 disposed thereon. It is also contemplated that other closure devices, such as Velcro, could replace the zipper. In an alternate embodiment, no pocket is provided.

Flexible fabric sheet 18 is typically constructed from a woven fabric that is both flexible and strong. The material is typically strong enough to hold the frame in the desired configuration. Alternatively, flexible fabric sheet 18 may be constructed from a thin plastic, reinforced paper, plasticized metal foil or a material sold by E. I. du Pont de Nemour Inc., under the trademark TYVEK. Flexible fabric sheet 18 may also be constructed from a plurality of individual sheets laminated together. In addition, flexible fabric sheet 18 may be adapted to reflect light. Furthermore, flexible fabric sheet 18 may include various colors, patterns, or logos to improve the appearance of the shade. Additionally, it is contemplated that flaps 24 may be detachably coupled to the center section 22 using snaps, Velcro, zippers, or any other conventional attachment method. Further, it is contemplated that the flaps 24 of the flexible fabric sheet 18 may be adapted to retain suction cups not shown for adhering to the side windows.

Figure 2:
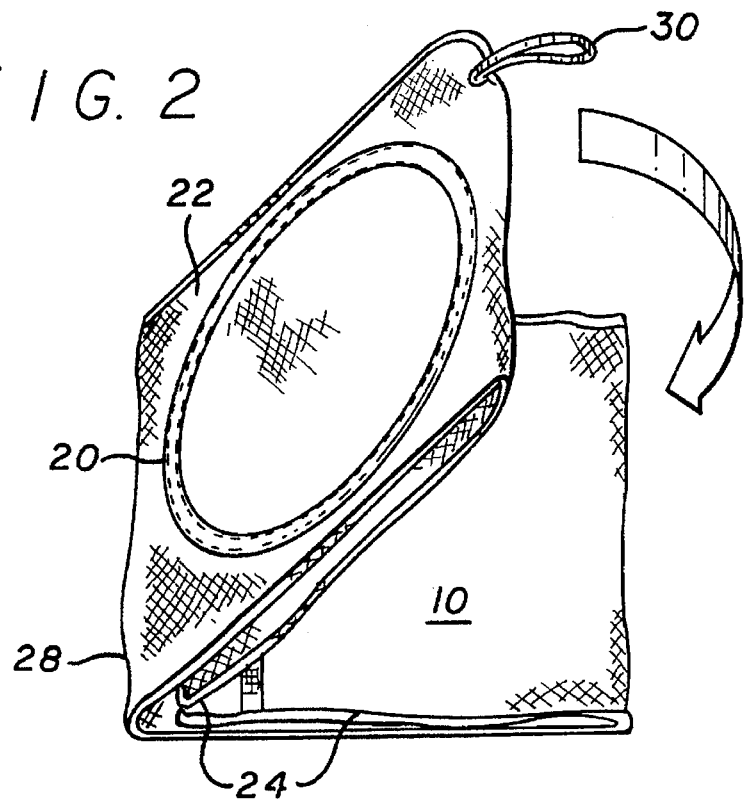
FIG. 2 is a perspective view showing the collapsible sunshield assembly of FIG. 1 being folded about a center fold line with its flaps adjacent to each other.

FIG. 2 presents one method for collapsing sunshield 10 (1) by initially folding center section 22 about a center fold line 28 with flaps 24 being folded along lines 27 and placed between the folded center section, and (2) by twisting the ends of flexible frames 20 in opposite directions while folding the sunshield inward until three interleaved circular loops are formed. In this fashion, the sunshield will typically collapse to a fraction of the original size. In addition, the sunshield generally remains in the collapsed condition without further restraint. However, sunshield apparatus 10 includes an elastic strap 30 that wraps around the shades in the collapsed condition, shown in FIG. 3 (not to scale with FIG. 2), to prevent the frames from unfolding. The collapsed sunshield assembly can then be placed in a pouch (not shown) or other storage container. A more detailed description of the collapsible feature can be found in U.S. Pat. No. 4,815,784, which is incorporated herein by reference.

Figure 5:
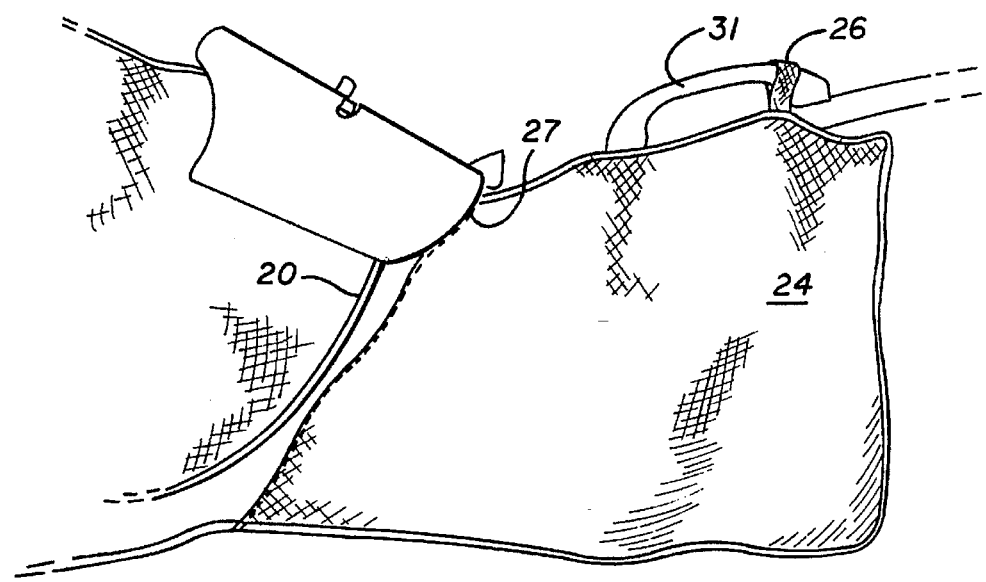
FIG. 5 is an internal installed view of a collapsible sunshield assembly of FIG. 1 covering the windshield and the side windows of an automobile.

As shown in FIG. 4, in the opened or deployed configuration, collapsible window shade 10 is a substantially flat and opaque sunshield that is placed against an automobile windshield and side windows to block out the sun rays and to visually conceal the interior of the car. Additionally, when the sunshield is not being used, flaps 24 and center section 22 can be folded into three interleaved circular loops for compact storage. FIG. 5 shows an internal view of a car with the shade 10 installed. This view shows attachment of the tabs 26 to the bar 31 commonly found above side windows in an automobile.

Figure 3:
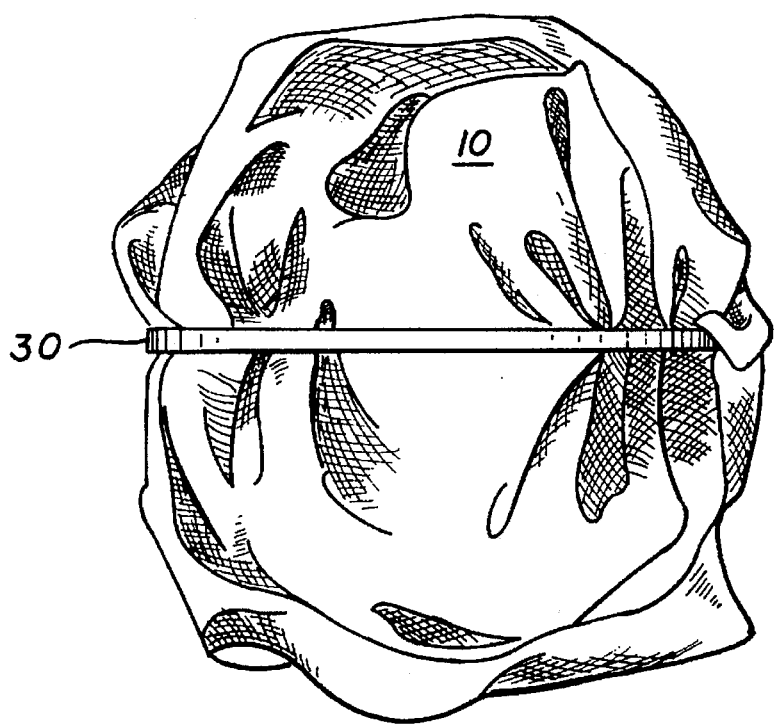
FIG. 3 is a perspective view showing the collapsible sunshield assembly of the invention collapsed for compact storage.
Figure 6:
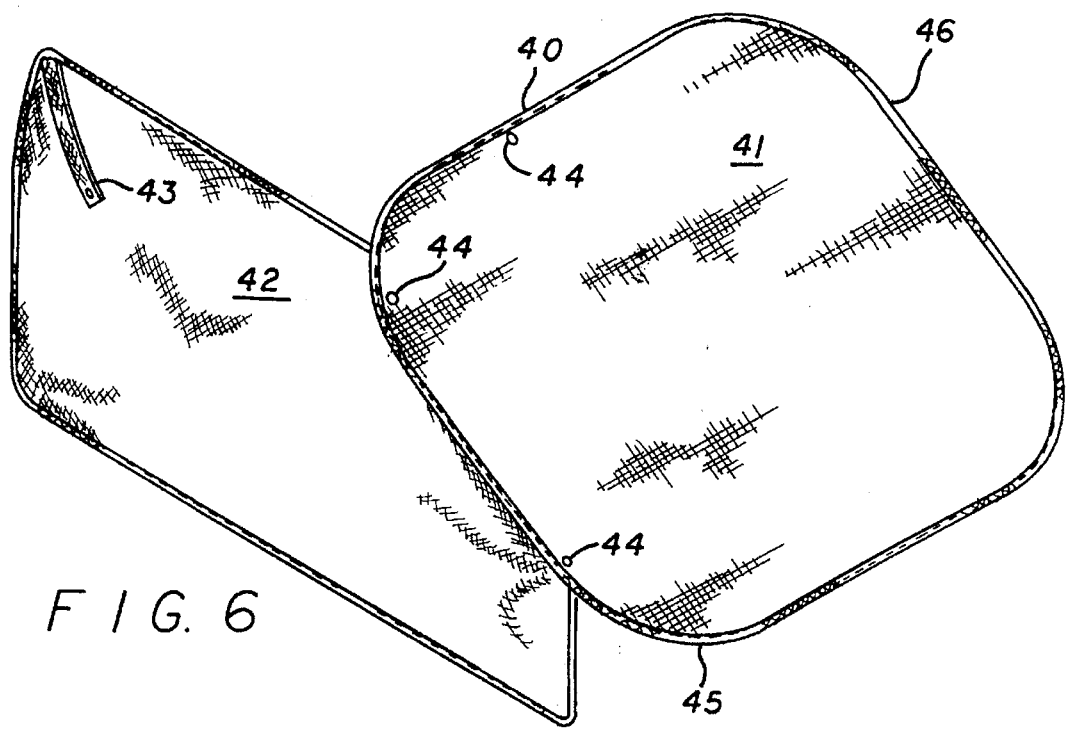
FIG. 6 is a perspective view of an alternative exemplary embodiment of the sun shield assembly of the present invention.

Now referring to FIG. 6 which depicts an alternative exemplary embodiment of the invention, panel 41 is composed of a flexible material and defined by flexible frame 40 with a plurality of snaps 44 disposed thereon. Flap 42 is detachably coupled to panel 41 along the line defined by any two adjacent snaps 44. Tab 43 functions as an attachment device whereby when installed, flap 42 covers the side window of an automobile, while panel 41 covers all or a part of the windshield. The planes defined by panel 41 and flap 42 intersect on the diagonal, thereby allowing panel 41 to accommodate the slope of a standard windshield while flap 42 shields a more vertical adjacent side window. This embodiment also collapses by twisting flexible frame 40 to form three concentric loops. This is accomplished by grasping opposing corners 45 and 46. The frame 40 is twisted in opposite directions at the grasp points until corner 46 has moved approximately 180° relative to corner 45. In this state, moving the corners 45 and 46 towards each other in a plane causes the frame 40 to form 3 concentric loops. In collapsed form shown in FIG. 3, the sun shield occupies much less space and can be easily stored in a pouch or other storage container. FIG. 3 is not to scale with FIG. 6.

Figure 7:
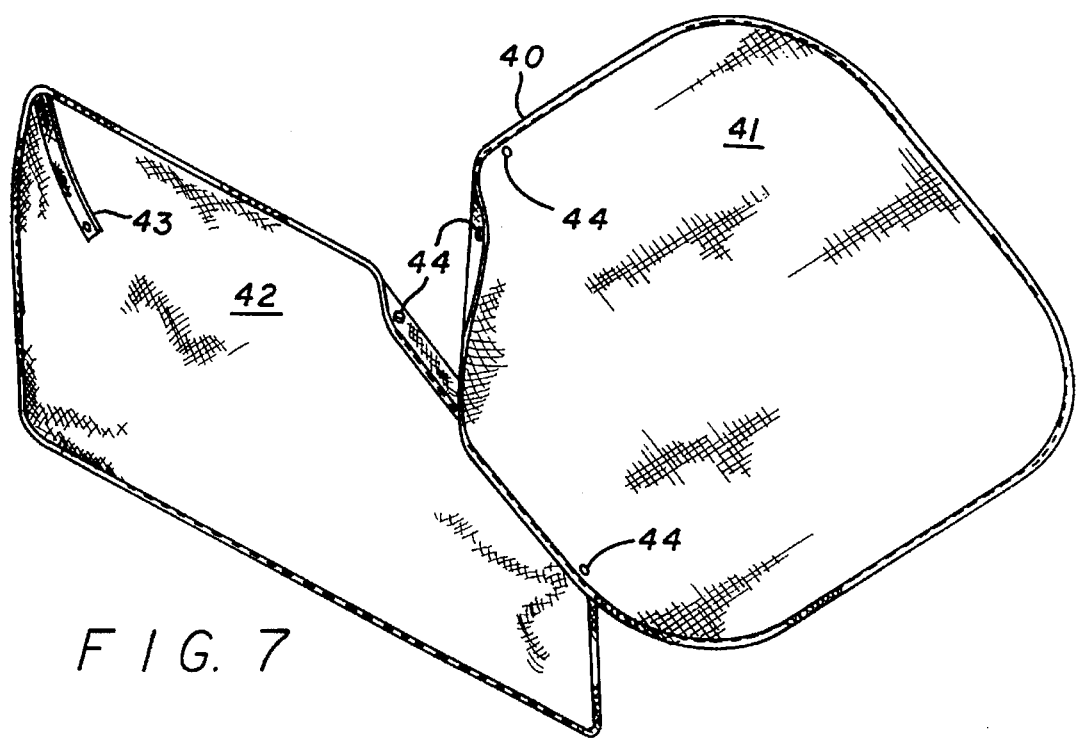
FIG. 7 is a perspective view of the sun shield assembly of FIG. 6 showing the flap partially detached.

FIG. 7 shows the alternative embodiment of FIG. 6 with one snap 44 disengaged and flexible frame 40 bent back to reveal same. It would be clear to one of ordinary skill in the art to use other conventional means of coupling instead of snaps, such as Velcro strips, clips, or even buckles. As such, all conventional fastening devices are within the scope and contemplation of the instant invention. Alternatively, flap 42 could be sewn directly to panel 41. Such embodiment could be provided with a pocket disposed partially on the flap 42 and partially on the panel 41.

While the embodiment shown in FIGS. 6 and 7 accommodates a portion of the windshield and the right side window, to accommodate the left side window, one need merely invert the flap 42 and resnap in the reversed position. Thus, it should be clear that an embodiment accommodating the right side window is merely a mirror image of an embodiment which would accommodate the left side window. It is also within the scope and contemplation of the invention that the flap 42 could be extended to cover at least one back side window, as well as at least one front side window. It is also within the scope and contemplation of the instant invention that the panel 41 would be large enough to cover the entire windshield and that it further has a second flap which mirrors flap 42 for covering the opposing side window.

While certain exemplary embodiments have been described in detail and shown in the accompanying drawings, it is to be understood that such embodiments are merely illustrative of and not restrictive of the broad invention and that this invention not be limited to the specific construction and arrangements shown and described, since various other modifications may occur to those ordinarily skilled in the art. Therefore, the scope of the instant invention should only be limited by the appended claims.

I claim:

1. A collapsible sun shield comprising:

at least one spring-like flexible frame forming at least one collapsible closed loop;

a substantially rectangular flexible sheet disposed upon the at least one frame to define a central region;

at least one flexible flap attached to each opposing lateral edge of the central region substantially along the length of the lateral edges, said flap having a central axis, said axis extending at an angle from the lateral edges, such that the central region can shade a first window and the flaps can shade a second window and a third window, the first window and the second window defining at least one substantial angle.

2. The collapsible sun shield of claim 1 wherein the flexible flap as disposed on the central region defines a predetermined angle.

3. The collapsible sun shield of claim 2 wherein each said flexible flap is detachably coupled to the flexible sheet disposed on the at least one flexible frame.

4. The collapsible sun shield of claim 3 wherein the flap is coupled to the central region using snaps.

5. The collapsible sun shield of claim 2 wherein the at least one flexible flap is long enough to shade both a front side window and a back side window.

6. The collapsible sun shield of claim 1 wherein a tab is disposed on the at least one flexible flap.

7. The collapsible sun shield of claim 6 wherein the tab is coupled to a suction cup.

8. The collapsible sun shield of claim 7 wherein a flexible flap is disposed on either end of the central region.

9. The collapsible sun shield of claim 1 wherein the flexible frame comprises a plurality of collapsible closed loops.

10. The collapsible sun shield of claim 1 wherein the at least one flexible flap is fixedly coupled to the central region to define a predetermined angle.

11. The collapsible sun shield of claim 10 further comprising a pocket disposed partially on the central region and partially on the flap.

12. The collapsible sun shield of claim 1 wherein the at least one flap is integrally formed with the central region to define a predetermined angle.

13. The collapsible sun shield of claim 1 further comprising a pocket disposed partially on the central region and partially on the flap.

14. In a motor vehicle, an improvement in combination comprising:

a windshield having a non-vertical slope;

side windows that are substantially vertical;

a sunshield having a flexible sheet having a central region disposed upon at least one collapsible spring-like closed loop, the central region disposed so as to approximate the slope of the windshield, the sunshield further having flexible flaps each coupled to opposing lateral edges of the central region, each flap having a central axis, said axis extending at an angle from the lateral edges, and disposed so as to be substantially vertical along at least one side window.

\* \* \* \* \*